United States Patent
Kumar et al.

(10) Patent No.: US 7,024,695 B1
(45) Date of Patent: Apr. 4, 2006

(54) METHOD AND APPARATUS FOR SECURE REMOTE SYSTEM MANAGEMENT

(75) Inventors: Mohan J. Kumar, Aloha, OR (US); Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,737

(22) Filed: Dec. 30, 1999

(51) Int. Cl.
*G06F 11/00* (2006.01)
*G06F 11/22* (2006.01)
*G06F 11/30* (2006.01)
*G06F 11/32* (2006.01)
*G06F 11/34* (2006.01)
*G06F 11/36* (2006.01)
*G06F 12/14* (2006.01)
*G06F 12/16* (2006.01)
*G06F 15/18* (2006.01)
*G08B 23/00* (2006.01)

(52) U.S. Cl. .............................. 726/26; 713/2; 713/159
(58) Field of Classification Search ................. 713/201, 713/159
See application file for complete search history.

(56) References Cited

U.S. PATENT DOCUMENTS

| | | | | |
|---|---|---|---|---|
| 5,666,415 | A | * | 9/1997 | Kaufman ..................... 713/159 |
| 5,884,312 | A | * | 3/1999 | Dustan et al. .................. 707/10 |
| 6,223,284 | B1 | * | 4/2001 | Novoa et al. ................ 713/100 |

* cited by examiner

Primary Examiner—Gilberto Barrón
Assistant Examiner—Benjamin E. Lanier
(74) Attorney, Agent, or Firm—Blakely, Sokoloff, Taylor & Zafman LLP (57) ABSTRACT

To prevent unauthorized access to hardware management information in an out-of-band mode, i.e., when the operating system of the hardware is not executing, a method and apparatus employ an authentication protocol. Upon receiving a request for hardware component information in a service processor that is disposed in a hardware component, which request is received as an open session request and which request passes external to an operating system controlling the hardware component, the service processor transmits a challenge string to the requesting client application. In response to a challenge response received from the requesting client application, the service processor compares the challenge response to an expected response to the challenge. The expected challenge response is calculated by the service processor. Based on the result of the comparison, the service processor transmits an authentication response to the requesting client application indicating success or failure of the authentication process. On the client side, in response to a challenge string from the service processor, the requesting client application transmits to the service processor a challenge response, which includes an sequence number that increments with every new message from the requesting client application. The challenge response also includes a hash number calculated by the requesting client application, which hash number is a function of the challenge string, session identification number, sequence number and/or a password. Each new packet including data and/or commands from the client application includes a similarly calculated hash number.

16 Claims, 6 Drawing Sheets

ASM CONSOLE-SERVER CONNECTION POINTS

METHOD AND APPARATUS FOR SECURE REMOTE SYSTEM MANAGEMENT

FIELD OF THE INVENTION

The invention relates generally to methods and apparatuses for remote management of a system, including transferring component information to remote applications, remote monitoring of system health, and the ability to perform corrective and/or preventive actions towards system health remotely. More particularly, the invention relates to a method and apparatus for transferring such control and data between a computer system and a remote application securely.

BACKGROUND OF THE INVENTION

Robust security is imperative for network-based systems, particularly for applications that deal with sensitive information, to prevent unauthorized agents from intercepting, corrupting or publishing sensitive data. A suitable information security system must perform with minimum disruption to users to ensure that authorized users are neither erroneously denied access nor unduly restricted in their duties.

Efforts exist in the server industry to develop a standard to create manageable hardware building blocks that share management information through a standard interface, known as the Intelligent Platform Management Interface (IPMI). This standard is designed to allow plug-and-play architecture for hardware management, thereby making possible scalable systems utilizing hardware from multiple vendors, while resulting in a completely manageable system.

Remote management of the IPMI occurs through host instrumentation client applications executing on the operating system. Several existing standards, such as the Desktop Management Interface (DMI), Common Information Model (CIM) and Simple Network Management Protocol (SNMP) define frameworks to access the management data through the operating system-based services. Management data can also be accessed directly in some systems without passing through the operating system or the main system processors, which access is called "out-of-band" access, and which can occur via modem, serial and local area network connections.

The remote access mechanisms used today provide limited security, such as clear text password, for direct access to the hardware components. Using this access, critical operations may be executed (e.g., shutting down or resetting the system). Therefore, it is imperative to include adequate security mechanisms for this access. Unfortunately, the platform management components (i.e., the micro-controllers that act as service processors) are usually low-cost hardware, and typically have very low processing power and memory. The security infrastructure therefore must not require significant processing capacity and memory resources from these devices without compromising security.

Figure 2:
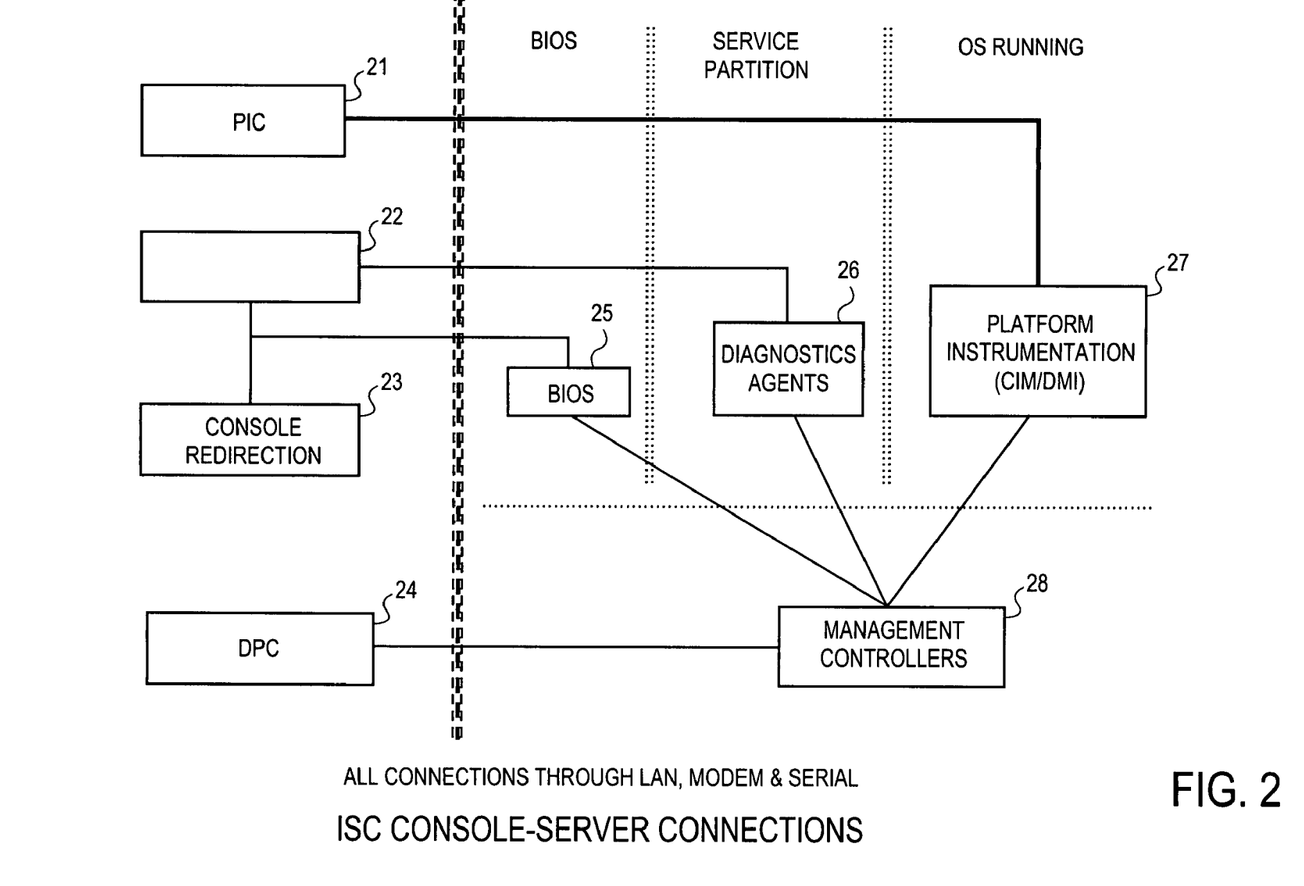
FIG. 2 depicts console connection for the ISC client application.
Figure 3:
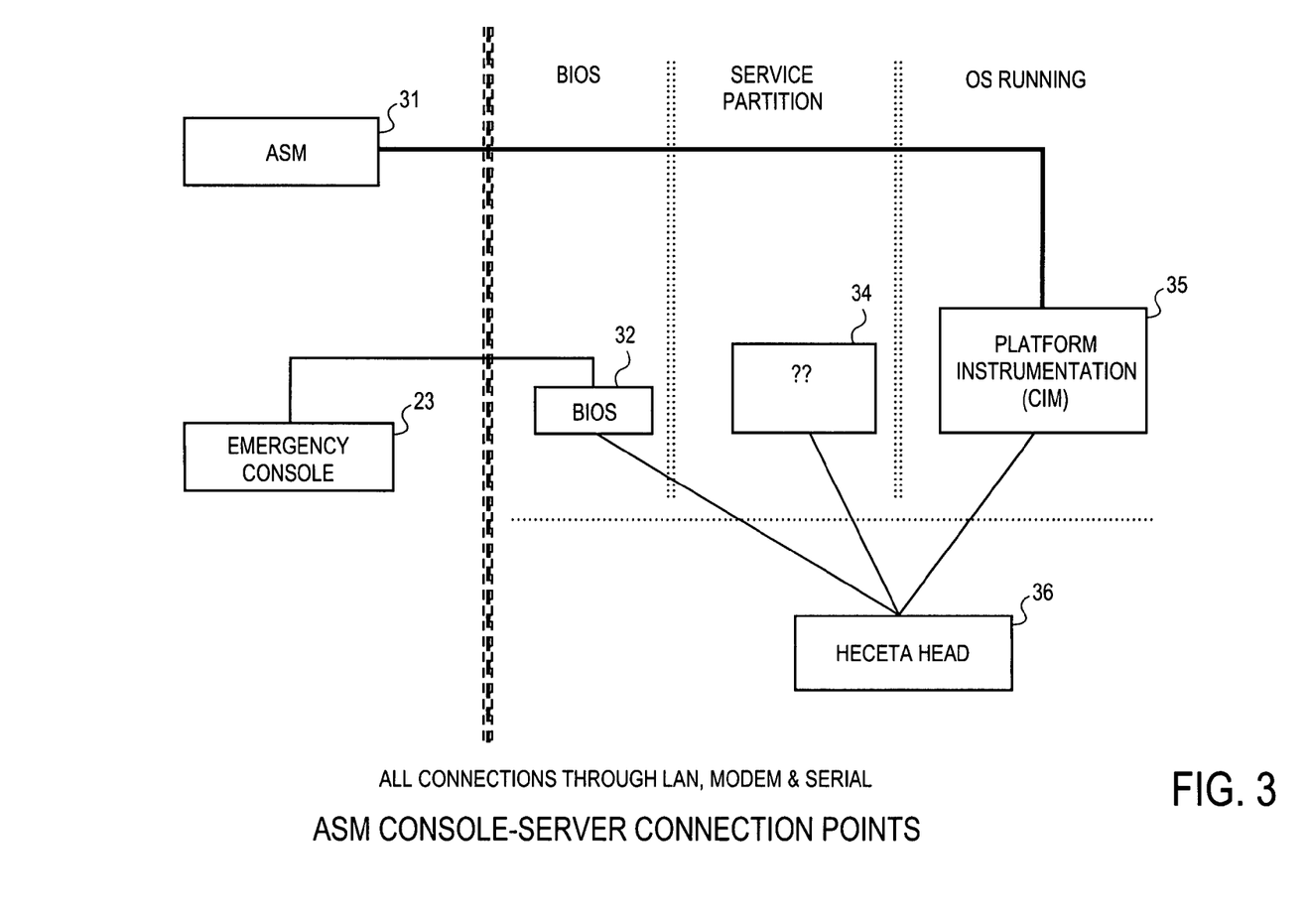
FIG. 3 depicts console connections for the ASM client application.

Examples of client applications that enable remote management of hardware components include the Intel Server Control (ISC) product and the Appliance Server Management (ASM) product. The ISC product allows in and out-of-band access to the server. The various connection points between the console and the server are depicted in FIG. 2. ASM provides similar functionality, the connections of which are depicted in FIG. 3.

Modest security mechanisms are provided for the ISC and ASM connections. In ISC, for example, a password routine protects access from the Direct Platform Control (DPC) console 24 to: (1) the Server Management Controllers (SMCs) 28; (2) the BIOS 25 (and the BIOS mode is accessible only if access to the SMC is authorized, as a command to remotely reboot the system can only be issued in this mode); (3) the Service Partition (and the service partition mode is only accessible if the access to the SMC is authorized, as a command to remotely reboot to the service partition can only be executed in this mode). In addition, in ISC the SMC can be configured to operate in a "Restricted Access Mode" preventing the DPC console from executing any Reset/PowerOff commands. In ISC, direct access to the firmware can also be completely disabled. In ASM, access from the ASM Emergency console 32 to BIOS 33 is protected by a password routine. In the ISC product, however, access from the Platform Instrumentation Control (PIC) 21 to the DMI instrumentation 27 on the operating system does not occur through any authorization process. This limitation originates with the DMI, which allows free access to the instrumentation. In contrast to the ISC, access from the ASM console 31 to the CIM instrumentation 35 is protected by a username/password validated by the web server (IIS) on the managed Windows Appliance.

An example of a service processor for interacting with client applications for managing hardware components is the Baseboard Management Controller (BMC), which provides a level of systems management via an external modem or a network adapter during all system states. This includes the powered-down, pre-boot, OS-down or OS-up situations. The DPC graphical user interface (GUI) communicates directly with the BMC. Even if the OS on the target server is operating, communications between the DPC and BMC do not pass through it.

The functionality that can be achieved through this connection is the monitoring of hardware sensors, access to sensor configuration access to the Platform Event log, and the capability to reboot, power cycle or shutdown the system. Consequently, this connection requires that a DPC user be properly authenticated, ensuring the user is authorized to perform the operations. The communication over the wire must be protected against spoofing, session hijacking or replay attacks. The privacy of the data is not critical, as security is not compromised if an unauthorized person reads a command to "reboot the system." The security of the system is protected as long as integrity of the data is preserved.

To complicate matters, there are certain restrictions in this environment that impact on the ability to integrate security measures into the interface. The management controller employed in this environment may have a low processing capability as well as limited resource capability, both in terms of code size, and the available memory to execute the code. Moreover, the due to aforementioned processing limitation, extensive computations that are typical of many security schemes are not possible.

The present invention is therefore directed to the problem of developing a method and apparatus that execute independently of the operating system for interfacing with hardware components via direct access from a remote device in a secure manner, without overly taxing the processing and memory resources of the hardware components.

SUMMARY OF THE INVENTION

The exemplary embodiments of the present invention are methods and apparatuses which prevent unauthorized access to hardware management information. A request for hardware component information to a service processor disposed in a hardware component is transmitted as an open session request from a requesting client application. That request is passed to the service processor, external to an operating system controlling the hardware component. The service processor sends challenge string to the requesting client application. The requesting client application then transmits to the service processor a challenge response. The requesting client application then receives from the service processor an authentication response, based on a comparison of the challenge response from the requesting client application and an expected challenge response calculated in the service processor.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The embodiments described herein employ an authentication protocol that does not unduly tax a service processor located in the hardware components, but prevents unauthorized access to hardware management information in an out-of-band mode. In general, the authentication aspects of the embodiments operate as follows.

Upon receipt of a request for hardware component information, which arrives in the form of an open session request that passes external to the operating system, the service processor transmits a challenge string to the requesting client application. The requesting client application then transmits a challenge response, which includes a sequence number that increments with every new message. The challenge response also includes a hash number calculated by the requesting client application, which hash number is a function of the challenge string, session identification number, sequence number and/or a password. Upon receipt of the challenge response, the service processor compares the challenge response to a calculated expected response to the challenge. The expected challenge response can be calculated in advance of receipt of the challenge response or as part of the response processing by the service processor. Based on the result of the comparison, the service processor transmits an authentication response to the requesting client application indicating success or failure of the authentication process.

In addition to the initial authentication protocol described above, each new command from the client application includes a similar authentication to verify it is a proper command. One possible implementation of this command and data authentication includes a hash number with every command and/or data transmitted to the service processor. As described above, the hash number can be a function of one or more of the session identification number, sequence number, password and the command and/or data.

The security of the scheme of the embodiments stems from the secret password that is only known to a few authorized entities (such as administrators of the system). This scheme is superior to a clear text password scheme (where the password text is transmitted in the open), since the password is never transmitted openly on the wire.

The salient security features of the scheme of the embodiments include one or more of the following:

1. The remote application requires the knowledge of the secret password to generate the keyed hash (or, more accurately, the Message authentication code).

2. Other malevolent entities on the wire are unable to decipher the secret password from the hash.

3. Other malevolent entities on the wire are unable to construct legitimate packets based on captured data traffic between the remote client and the system.

4. Other malevolent entities on the wire are unable to replay the captured data traffic at a later time to repeat a specific action (i.e., a replay attack is not possible).

5. The integrity of the data communication is preserved. That is, should the content of the data packet from remote client be changed on the wire (intercept and modify attack), the system receiving the packet would be able to detect the change (since the hash computed will not match with the hash in the packet).

Figure 1:
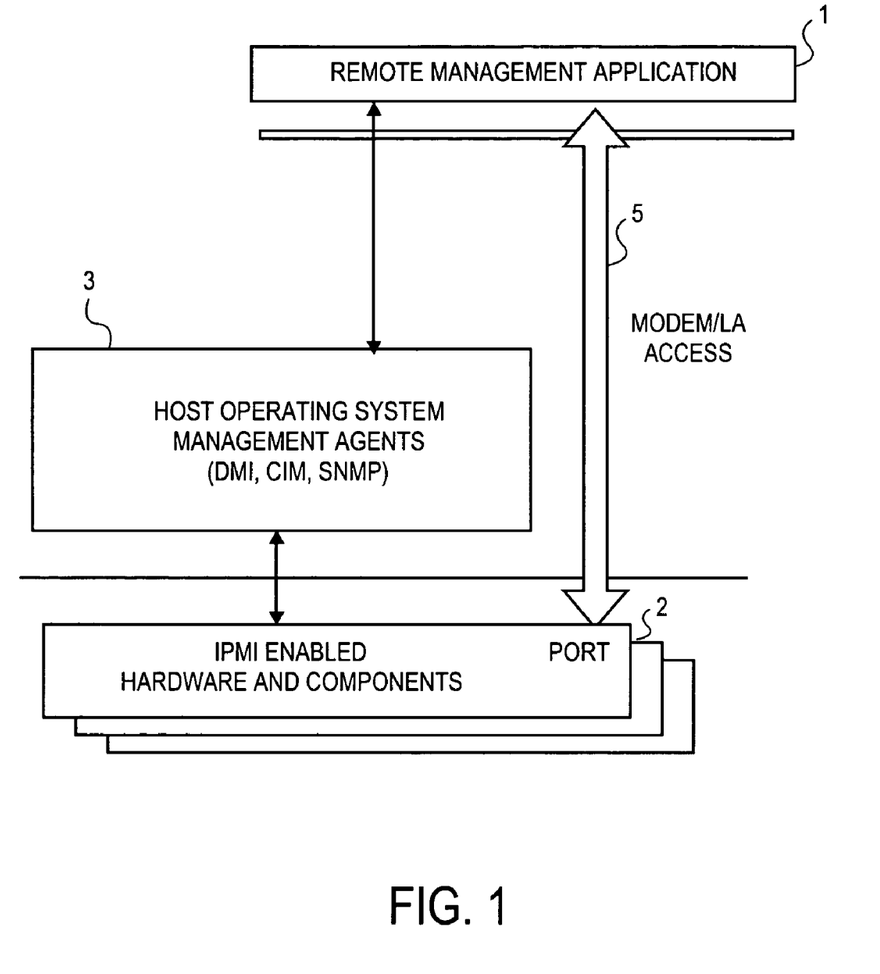
FIG. 1 depicts an example of an environment to which the exemplary embodiments are applied.

Turning to FIG. 1, depicted therein is a remote management application 1 accessing an IPMI-enabled hardware component 2 directly bypassing the operating system 3 otherwise controlling the operation of the IPMI-enabled hardware 2, which remote management application 1 and IPMI-enabled hardware component 2 may use the method and apparatus of the present invention. An exemplary embodiment of a method for authenticating a client application ensures that this access is performed only by authorized users.

The exemplary embodiment provides authentication of the requesting client application. IPMI-enabled hardware components are accessible directly via modem, local area network or wire connections 5, without such requests passing through the host operating system 3. Consequently, operating system dependent authentication schemes are not applicable. Moreover, as remote management client applications 1 can obtain information and perform service routines without informing the operating host system 3, this access must be secured. The exemplary embodiments provide sufficient authentication to secure the connection without overly taxing the service processor tasked with implementing the authentication protocol.

To provide adequate security using low-powered processors, an exemplary embodiment uses a in-built security solution in the service processor tailored to the limited resources environment of the service processor. One example of a service processor is a baseboard management controller (BMC). This exemplary embodiment employs a four-pronged authentication protocol, which prevents both unauthorized access and spoofing, but does not protect the privacy of data, thereby avoiding complex computations necessary for encryption algorithms.

First, the exemplary embodiment employs a Challenge Handshake Authentication Protocol (CHAP)-based authentication protocol, which consists of a challenge, response and verification. Second, the exemplary embodiment employs a unique session identification number for each access session. Third, the exemplary embodiment employs an incrementing sequence number for each message. Fourth, the exemplary embodiment employs a hash calculation on one or more of the following: session ID, sequence number and password, which are known to the authenticating processor. This enables the authenticating processor to calculate the same hash and compare the result, thereby verifying that at least the requestor possesses the same knowledge, indicative of the correct identification of the user. In addition, subsequent commands and data messages are combined with a hash calculated on the transmitted command and/or data, as well as the other values, such as password, sequence number and session identification number. The combination of these features provides a powerful, yet readily implementable authentication routine capable of being performed even by relatively small capacity processors usually employed in hardware components.

Authentication Protocol (CHAP Based)

The basic protocol employed in the authentication process is based on a challenge, response verification technique, such as CHAP. In this protocol, DPC messages are sent as UDP (User Datagram Protocol) datagrams over IP (Internet Protocol) at the network layer. The DPC server (e.g., the BMC) listens on a designated port for serving DPC requests. All communications between the DPC Console and the service processor begin with an "Open Session" command. Various fields are added to the DPC messages to allow establishing a secure session.

Figure 4:
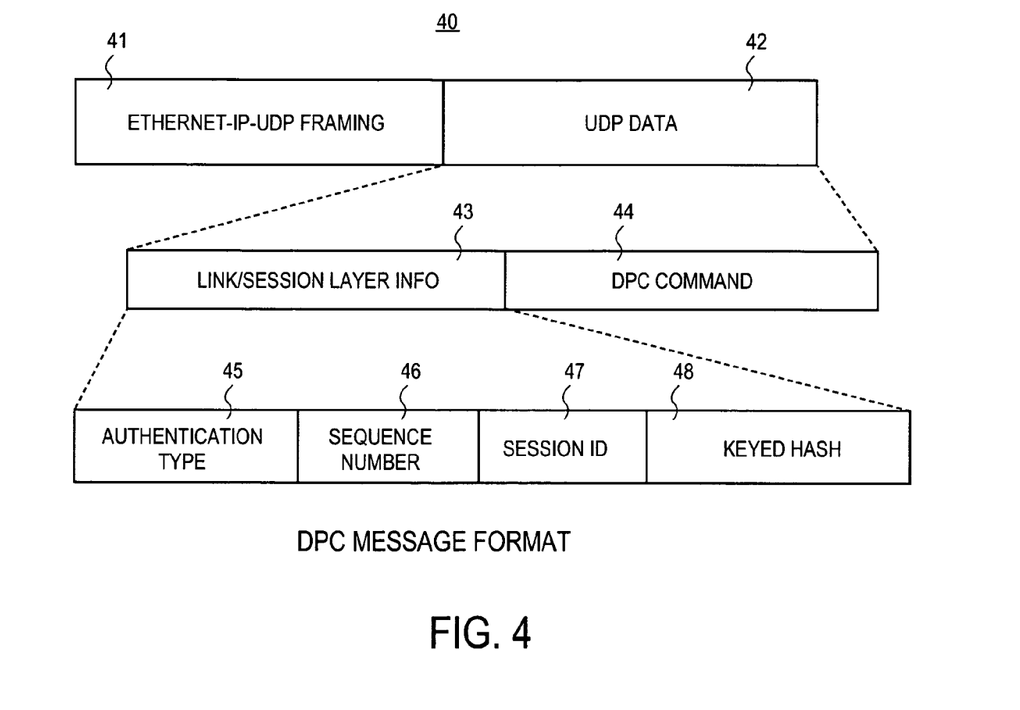
FIG. 4 depicts a DPC message format as a User Datagram Protocol.

FIG. 4 depicts the message structure of the DPC message 40. The message 40 includes Ethernet-IP-UDP Framing 41 and UDP Data 42. The UDP data 42 includes Link/Session Layer Information 43 and a DPC Command 44. The Link/Session Layer Information 43 includes four parts—an authentication type 45, a sequence number 46, a session Identification number (ID) 47 and a keyed hash 48. At the Link/Session Layer Information 43, the message contains "Authentication Type" 45 as the first field. The other fields (46, 47 and 48) in this layer are authentication protocol-specific.

The DPC supports multiple authentication schemes to provide protection against sending critical service requests (for example, power control) by an unauthorized user over the network. The DPC authenticates a client or user prior to a session establishment. The DPC also authenticates each message request during the session. The Authentication Type employed in the exemplary embodiments includes the Challenge Handshake Authentication Protocol (CHAP), however, other authentication protocols may be used without departing from the scope of the invention.

Authentication Type

The embodiments employ an authentication type such as Challenge-Handshake Authentication Protocol (CHAP). CHAP is an authentication method that can be used when connecting to an Internet Service Provider. CHAP allows one to login to a provider automatically, without the need for a terminal screen. It is more secure than the Password Authentication Protocol (another widely used authentication method) since it does not send passwords in text format.

Sequence Number Incrementing

One embodiment of the invention includes automatically incrementing the sequence number during a session. One implementation of the "Sequence Number" 46 is a four-byte field. Other sizes are possible, depending upon the implementation. Four bytes should be sufficient in most instances.

To further protect the transmission security, the requester increments the sequence number 46 after sending a message. The responder incorporates the same sequence number 46 in its response. The sequencing of messages provides protection against playback attack over the network. It also avoids retransmission of the replies due to duplication of the requests in the network. A recipient ignores the duplicated messages silently.

Unique Session Identification

To further protect communications, each session is assigned a unique identification number or "session ID". The session ID 47 is also a four-byte field. Other sizes are possible, depending upon the implementation details. Four bytes should be sufficient in most cases. The server or authenticator generates a unique value as session identifier 47, which must be maintained throughout the session. If a service processor receives a message with an incorrect session identifier, it ignores the message as discussed previously with regard to the Sequence Number 46.

Hash

The Keyed Hash 48 is a multi-byte field and its length varies depending on the algorithm used. Examples of suitable algorithms include Message Digest-2 (MD2), Message Digest-5 (MD5) and Secure Hash (?) (SHA-2). For MD2 (message digest-2) algorithm, this field is 16 bytes long.

A hash is a bit sequence created from the manipulation of another bit sequence, such as a password, which resulting bit sequence (or hash) can then be sent in the clear without fear of providing the password to an unauthorized user, thereby enabling attack on the system by an unauthorized user. Many different algorithms exist for creating a hash, such as MD-2 and MD-5, SHA-2, etc. Any of these algorithms may be used in the embodiments without departing from the invention.

Exemplary Operation of a Session

Figure 5:
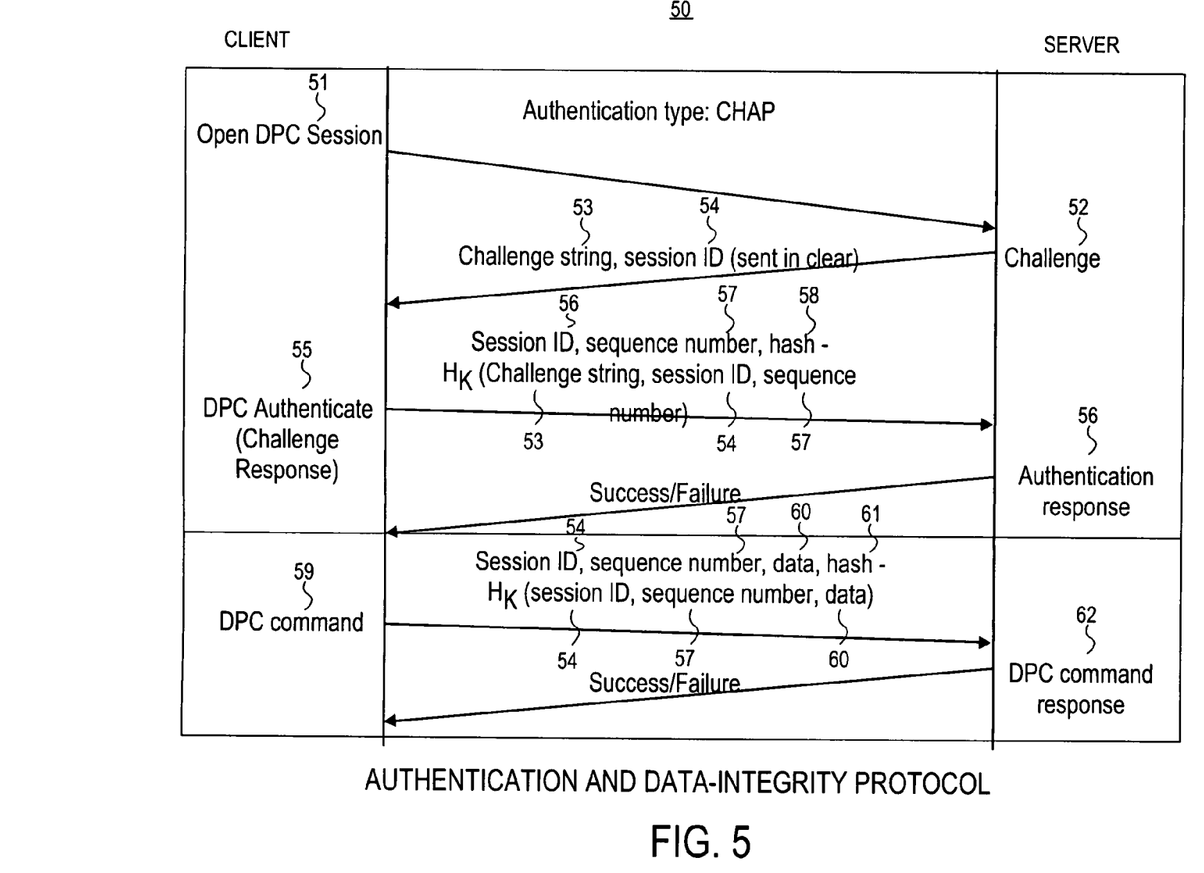
FIG. 5 depicts an exemplary embodiment of a method for authenticating a user when accessing a hardware component out-of-band.

FIG. 5 depicts an exemplary authentication session 50 using above the technique in a service processor, such as a BMC, and a remote client application environment. The session is initiated when the client transmits an Open DPC Session request 51 via the Remote Management Application 1.

When the client requests an Open DPC Session 51 with a CHAP-type of authentication scheme (identified in Authentication Type 45), the server or authenticator (e.g., the BMC, which is the IPMI-enabled hardware component 2 of FIG. 1) generates a challenge 52, which is sent in the clear to the requester of the Open DPC Session 51. The challenge 52 includes a four-byte binary "challenge string" 53 and an identifier or "session ID" 54 (in the Session ID field 47, see FIG. 4), which are intended for the requester to incorporate in the response message.

The "challenge string" 53 generated should be unique. This means, at different instances of the Open DPC Session 51 request, the challenge string generated should be different, even for the same user. The client (i.e., the remote management application), on reception of the response to the Open DPC Session 51 request, must send the challenge message as a part of the authentication handshake process.

In response to the challenge message 52, the client returns a challenge response message 55, which includes the Sequence Number 46, Session ID 47, and a Keyed Hash 48. The Keyed Hash 48 is a function of one or more of the challenge string 53, the Session ID 47 and the Sequence Number 46.

Upon receipt of the challenge message 52, the client generates a "hash" value using the "user-password", which is known only to the authenticator (i.e., the server) and, of course, the client. The hash is calculated based upon one or more of the values of the challenge string 53, Session ID 47 and the Sequence Number 46. At the session layer, the client must use the Session ID 47 sent by the server in the previous response.

Upon receipt of the challenge response 55, the authenticator/server calculates an expected hash value and compares the expected hash value to the received hash value 58 in the challenge response 55 from the client. In response to the comparison, the authenticator sends an authentication response 56, indicating either success or failure of the authentication.

In addition to comparing the expected hash value to the received hash value, the authenticator/server checks the received session identification and the sequence number to verify the proper values have been supplied. Of course, by calculating the expected hash using these same values, and comparing the expected hash to the received hash, the authenticator can confirm in a single step whether the proper values have been supplied for the session identification and the sequence number. If the sequence number and session identification are used to derive the hash value, along with the password, then the received hash will not match the expected hash unless all of the values of which the hash is a function are correct.

If the expected hash matches the received hash 58, the authenticator sends a message indicating "success" of the authentication process. Otherwise, the authenticator responds with the "failure" message to the client. This ends the authentication process 50.

At this point, the client may begin with the application or platform specific IPMI requests. As already mentioned above, the messages may contain fields that are authentication scheme specific depending on the scheme of the authentication that has been requested while opening the session. These messages will always have the "authentication type" field set to that requested in the Open DPC Session 51 message-request.

Moreover, each packet of data and/or commands is further verified to determine it contains the correct values. This is accomplished by performing a hash of the data packet (along with one or more other values, such as the password, session ID and sequence number) and sending the hash value along with the data packet. This enables the recipient (either the service processor or the client application) to determine if the data was received correctly and without corruption. This is described in more detail below.

Data-Integrity Protocol

The bottom portion of FIG. 5 describes the data-integrity protocol for the rest of the session between the DPC console and the service processor, e.g., the BMC.

As described in the previous section, all the DPC messages or commands 59 contain a Hash 48, 58, 61 (which Hash changes with each message exchanged) of the message itself. The Hash 61 as part of the DPC Command 59 is performed on the complete DPC message 59, which includes the message body or data 60, the session ID 54 and the sequence number 57.

The following is a description of the hash function.

Keyed Hash 48 (also called Message Authentication Code):

$$H_K(P)=C,$$

where H is the hashing algorithm, P—plain text, C—hash, K—secret key. One possible embodiment of the hashing algorithm is MD2 (Message Digest 2). Other possible implementations include MD5 or SHA-2. Other hashing algorithms are possible and should be selected to not unduly tax the service processor that must perform these calculations, particular in the embodiments that do so on every command and data transmission.

The Keyed Hash 48 prevents against the modification of the data in transit, and also prevents against a replay attack (since Sequence Number 46 and Session ID 47 are part of the Keyed Hash 48). As the Sequence Number 46 and Session ID 47 are unique, each Keyed Hash 48 transmitted will be unique, thereby preventing retransmission of a previous message.

Next is described each of the connections to the hardware components.

Exemplary Embodiment of System for Accessing Hardware Component Information

Figure 6:
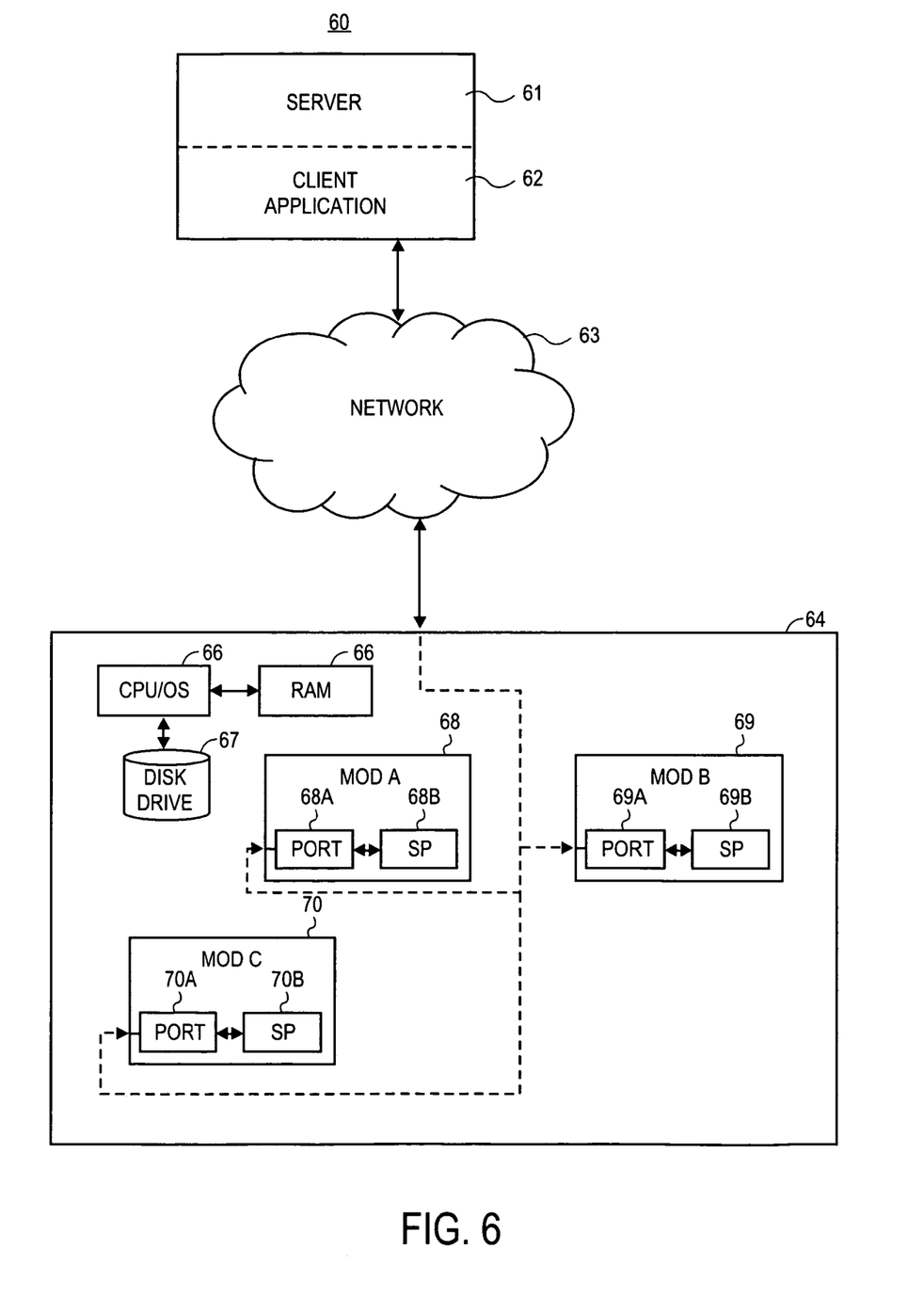
FIG. 6 depicts an exemplary embodiment of a system to which the method of FIG. 5 is applicable.

Turning to FIG. 6, an exemplary embodiment of a system 60 for accessing hardware component information from hardware modules 68, 69 and 70 in a computer 64 bypasses the operating system executing on the CPU 65 of the computer 64 and accesses the hardware modules 68, 69 and 70 directly via a modem, local area network or wire connection. The computer 64 includes a CPU 65 on which an operating system executes that controls the operation of the computer 64, disk drive 67 and random access memory 66, as well as the modules 68, 69 and 70.

Each hardware module 68, 69 and 70 includes a service processor 68b, 69b, and 70 b, respectively, for processing these requests and a port 68a, 69a and 70a via which the connection to the server is made. The service processor 68b, 69b, and 70b is typically a relatively low-level controller, at least compared to the processor 65 executing the operating system in the computer 64. Consequently, the authentication protocol employed cannot be unduly taxing on the service processor's capacity.

A server 61, on which is executed a remote client application 62 for managing the hardware component information, accesses each of the service processors 68b, 69b and 70b, as necessary. The connection between the server 61 and the computer 64 can be via a network 63, such as the Internet or an intranet, or via direct modem, LAN or wire connection.

The client application 62 interacts with the service processor 68b, 69b and 70b in the authentication process. The service processor 68b, 69b and 70b authenticates requests from the client application 62 requesting access to the service processor's host hardware module 68, 69 and 70. These requests bypass the operating system of the computer 64. Each service processor 68b, 69b and 70b, in response to a request for access to the host hardware module 68, 69 and 70, respectively, is programmed to: (1) transmit a challenge string to a requesting client application 62; (2) compare a challenge response received from the requesting client application 62 with an expected response to the challenge; and (3) transmit an authentication response to the requesting client application 62 based on the comparison.

During the authentication process, each of the service processors 68b, 69b and 70b assigns a session identification number unique to each session and transmits the session identification number to the requesting client application 62 in the challenge string. In addition, each of the service processors 68b, 69b and 70b reviews the challenge response to determine if it contains the session identification number transmitted in the challenge string. Furthermore, each of the service processors 68b, 69b and 70b compares a sequence number included in the challenge response against previously received sequence numbers and ignores the challenge response if it does not include a sequence number in correct sequence.

In addition to the above, each of the service processors 68b, 69b and 70b compares a hash number received in the challenge response with an expected hash calculated by the service processor 68b, 69b and 70b and transmits a success or failure message depending upon a result of the comparison. The hash includes one or more of the following: the challenge string, the session identification number, the sequence number and a password.

After the initial authentication process, each of the service processors 68b, 69b and 70b examines each command sent by the client application 62 for one or more of the following: the session identification number, the sequence number and a hash number, wherein the hash number is a function of one or more of the following: the session identification number, the sequence number and the command.

On the client side, the client application 62 transmits a request for hardware component information to a service processor 68b, 69b and 70b disposed in a hardware component 68, 69 and 70, respectively, as an open session request, which request passes external to an operating system executing on the CPU 65 and otherwise controlling the hardware component 68, 69 and 70. Upon receiving a challenge string from the service processor 68b, 69b and 70b, the client application 62 transmits a challenge response to the service processor 68b, 69b and 70b. Next, the client application 62 receives an authentication response from the service processor 68b, 69b and 70b based on a comparison of the challenge response from the client application 62 and an expected challenge response calculated in the service processor 68b, 69b and 70b.

The challenge string includes a session identification number assigned by the service processor 68b, 69b and 70b, which session identification number is unique to each session, and the challenge response includes the session identification number. The challenge response also includes a sequence number, which increments with every new message from the requesting client application 62. In addition, the challenge response includes a hash number calculated by the requesting client application 62. The hash number is a function of one or more of the following: the challenge string, the session identification number, the sequence number and a password.

After the initial authentication session, the client application 62 transmits with each data and/or command packet one or more of the following: the session identification number, the sequence number and a keyed hash. The keyed hash is a function of one or more of the following: the session identification number, the sequence number and the data and/or command. Various combinations of the above values can be sent to verify the integrity of the data and/or command packet, thereby preventing malicious activity based on the substitution of the data and/or command packet with different information.

SUMMARY

The above embodiments provide a method and apparatus for authenticating a remote client application executing on a remote server by a service processor located in a hardware component of a large computer system, rather than having to use the main processors and/or operating system of the server. The access bypassing the computer system operating system is authenticated by the service processor by using a challenge-based protocol, a unique session ID assigned by the service processor and an incrementing sequence number. In addition, the service processor calculates a hash of one or more of these values and the user's password, and compares this to a received hash to verify the user has transmitted the appropriate information. Furthermore, once the initial session is authenticated, further data and/or command packets transmitted are checked for their integrity using a keyed hash. This process does not unduly tax the service processor, and therefore allows good security without having to use the main server processors, to upgrade the server processors or include an additional security processor.

Although various embodiments are specifically illustrated and described herein, it will be appreciated that modifications and variations of the invention are covered by the above teachings and within the purview of the appended claims without departing from the spirit and intended scope of the invention. For example, while several of the embodiments describe the use of a keyed hash in combination with one or more other values, such as sequence numbers, session identification numbers, any combination of these values may be employed without departing from the scope of the invention. In addition, while some of the above embodiments describe examples of algorithms used to calculate a hash value, any algorithm will suffice. These examples should not be interpreted to limit the modifications and variations of the invention covered by the claims but are merely illustrative of possible variations.

What is claimed is:

1. A method, comprising:
    receiving a request for hardware component information at a service processor disposed in a hardware component as an open session request from a requesting client application;
    transmitting from the service processor a challenge string to the requesting client application, the challenge string including a session identification assigned by the service processor, wherein the session identification is unique to each session;
    receiving at the service processor a challenge response from the requesting client application, the challenge response including the session identification and a first hash number that comprises a function of at least one of the challenge string, the session identification, a sequence number, and a password;
    comparing the challenge response to an expected response to the challenge string, wherein the comparing includes verifying the session identification received in the challenge response against the session identification transmitted in the challenge string;
    transmitting the hardware component information to the requesting client application; and
    receiving at the service processor a direct platform control (DPC) message from the client application, the DPC message including a second hash number to verify the integrity of the DPC message, wherein the DPC message is to perform one or more of connecting to Basic Input Output System (BIOS), rebooting, resetting, and shutting down of the service processor.

2. The method of claim 1, wherein the challenge response includes the sequence number, wherein the sequence number increments with every new message.

3. The method of claim 1, further comprising examining the DPC message received from the client application for one or more of the session identification, the sequence number, and the second hash number.

4. The method of claim 3, wherein the second hash number comprises a function of at least one of a body of the DPC message, the session identification, the sequence number, and the password.

5. A method, comprising:
transmitting a request for hardware component information to a service processor disposed in a hardware component as an open session request from a requesting client application;
receiving from the service processor a challenge string at the requesting client application, the challenge string including a session identification assigned by the service processor, wherein the session identification is unique to each session;
transmitting to the service processor a challenge response from the requesting client application, the challenge response including the session identification and a first hash number that comprises a function of at least one of the challenge string, the session identification, a sequence number, and a password;
receiving from the service processor an authentication response to the requesting client application based on a comparison of the challenge response from the requesting client application and an expected challenge response calculated in the service processor, wherein the comparison includes verifying the session identification in the challenge response transmitted to the service processor against the session identification received in the challenge string; and
receiving at the service processor a direct platform control (DPC) message from the client application, the DPC message including a second hash number to verify the integrity of the DPC message, wherein the DPC message is to perform one or more of connecting to Basic Input Output System (BIOS), rebooting, resetting, and shutting down of the service processor.

6. The method of claim 5, wherein the second hash number comprises a function of at least one of a body of the DPC message, the session identification, the sequence number, and the password.

7. An apparatus, comprising:
a remote access port; and
a service processor coupled to the remote access port, wherein the service processor including a machine-readable medium, having stored thereon a set of instructions which, when executed, cause the service processor to:
in response to a remote request for information about a component received as an open session request through the remote access port external to a host operating system of the apparatus, transmit a challenge string to a requesting client application, the challenge string including session identification assigned by the service processor, wherein the session identification is unique to each session;
compare a challenge response received from the requesting client application with an expected response, the challenge response including the session identification and a first hash number that comprises a function of at least one of the challenge string, the session identification, a sequence number, and a password, wherein the comparing includes verifying the session identification received in the challenge response against the session identification transmitted in the challenge string;
transmit an authentication response to the requesting client application based on the comparison; and
receiving at the service processor a direct platform control (DPC) message from the client application, the DPC message including a second hash number to verify the integrity of the DPC message, wherein the DPC message is to perform one or more of connecting to Basic Input Output System (BIOS), rebooting, resetting, and shutting down of the service processor.

8. The apparatus of claim 7, wherein the service processor compares the sequence number included in the challenge response against previously received sequence numbers and ignores the challenge response if it does not include a sequence number in correct sequence.

9. The apparatus of claim 7, wherein the service processor compares the first hash number received in the challenge response with an expected hash calculated by the service processor and transmits a success or failure message depending upon a result of the comparison.

10. A system, comprising:
a processor;
a memory; and
a client application stored on a machine-readable medium, the client application including a set of instructions which, when executed, cause the client application to:
transmit a request for hardware component information to a service processor disposed in a hardware component as an open session request;
receive from the service processor a challenge string at the requesting client application, the challenge string including a session identification assigned by the service processor, wherein the session identification is unique to each session;
transmit to the service processor a challenge response from the requesting client application, the challenge response including the session identification and a first hash number that comprises a function of at least one of the challenge string, the session identification, a sequence number, and a password;
receive from the service processor an authentication response to the requesting client application based on a comparison of the challenge response from the requesting client application and an expected challenge response calculated at the service processor, wherein the comparison includes verifying the session identification received in the challenge response against the session identification in the challenge string; and
receiving at the service processor a direct platform control (DPC) message from the client application, the DPC message including a second hash number to verify the integrity of the DPC message, wherein the DPC message is to perform one or more of connecting to Basic Input Output System (BIOS) rebooting, resetting, and shutting down of the service processor.

11. A machine-readable medium having stored thereon data representing sets of instructions which, when executed by a machine, causes the machine to:
receive a request for hardware component information to a service processor disposed in a hardware component as an open session request;
transmit from the service processor a challenge string at the requesting client application, the challenge string including a session identification assigned by the service processor, wherein the session identification is unique to each session;
receive at the service processor a challenge response from the requesting client application, the challenge response including the session identification and a first hash number that comprises a function of at least one of the challenge string, the session identification, a sequence number, and a password;

compare the challenge response to an expected response to the challenge string, wherein the comparing includes verifying the session identification received in the challenge response against the session identification transmitted in the challenge string;

transmit the hardware component information to the requesting client application; and receiving at the service processor a direct platform control (DPC) message from the client application, the DPC message including a second hash number to verify the integrity of the DPC message, wherein the DPC message is to perform one or more of connecting to Basic Input Output System (BIOS), rebooting, resetting, and shutting down of the service processor.

12. The system of claim 10, wherein the service processor compares the sequence number included in the challenge response against previously received sequence numbers and ignores the challenge response if it does not include a sequence number in correct sequence.

13. The system of claim 10, wherein the service processor compares a first hash number received in the challenge response with an expected hash calculated by the service processor and transmits a success or failure message depending upon a result of the comparison.

14. The machine-readable medium of claim 11, wherein the sequence number included in the challenge response increments with every new message.

15. The machine-readable medium of claim 11, wherein the set of instructions which, when executed by the machine, further causes the machine to examine each packet received from the client application for one or more of the session identification, the sequence number, and the first hash number.

16. The method of claim 6, wherein the sequence number increments with every new message.

* * * * *